US005653907A

United States Patent [19]
Kendall et al.

[11] Patent Number: 5,653,907
[45] Date of Patent: Aug. 5, 1997

[54] LIGHTWEIGHT THERMALLY RESPONSIVE MOLD FOR RESIN TRANSFER MOLDING

[75] Inventors: Kenneth Neil Kendall, Dearborn, Mich.; Alan Robert Harrison, Benfleet, England

[73] Assignee: Ford Motor Company, Dearborn, Mich.

[21] Appl. No.: 601,812

[22] Filed: Feb. 15, 1996

[51] Int. Cl.$^6$ .................................... B29C 33/42
[52] U.S. Cl. ............... 249/79; 249/80; 249/116; 249/135; 425/544; 425/547; 264/236; 264/328.005; 264/328.014
[58] Field of Search ................ 425/126.1, 117, 425/544, 116, 451.9, 547, 129.1; 264/225, 236, 328.4, 328.5, 328.14; 249/79, 80, 114.1, 116, 135

[56] References Cited

U.S. PATENT DOCUMENTS

| | | | |
|---|---|---|---|
| 2,313,253 | 3/1943 | McWane | 249/80 |
| 2,591,858 | 4/1952 | Ostendorf | 249/80 |
| 2,776,453 | 10/1957 | Kish | 264/225 |
| 2,994,297 | 1/1961 | Toulmin, Jr. | 118/48 |
| 3,723,584 | 3/1973 | Nussbaum | 249/80 |
| 3,734,449 | 5/1973 | Itou et al. | 249/114 |
| 3,792,986 | 2/1974 | Scott et al. | 249/114.1 |
| 4,018,552 | 4/1977 | Prast et al. | 249/80 |
| 4,338,068 | 7/1982 | Suh et al. | 425/144 |
| 4,872,827 | 10/1989 | Noda | 249/79 |
| 5,041,247 | 8/1991 | Kim | 264/37 |
| 5,156,754 | 10/1992 | Nomura et al. | 249/134 |
| 5,169,549 | 12/1992 | Weber | 249/80 |
| 5,176,839 | 1/1993 | Kim | 249/78 |
| 5,204,042 | 4/1993 | James et al. | 264/257 |
| 5,266,259 | 11/1993 | Harrison et al. | 264/257 |
| 5,376,317 | 12/1994 | Maus et al. | 264/40.6 |
| 5,388,803 | 2/1995 | Baumgartner et al. | 249/111 |
| 5,437,547 | 8/1995 | Holton et al. | 425/548 |

*Primary Examiner*—Jay H. Woo
*Assistant Examiner*—Iuric A. Schwarz
*Attorney, Agent, or Firm*—Joseph W. Malleck; Roger L. May

[57] ABSTRACT

A lightweight thermally responsive mold for use with a resin transfer molding process is provided. The mold includes first and second support frames including a plurality of upstanding intersecting support ribs. First and second substrates are supported by the first and second support frames, respectively, for carrying heating tubes therein. First and second hard shells are supported by the first and second substrates, respectively. The shells cooperate to form a mold cavity therebetween. Each shell is less than approximately 10 mm thick in order to provide a low thermal mass and high thermal responsiveness.

9 Claims, 5 Drawing Sheets

5,653,907

LIGHTWEIGHT THERMALLY RESPONSIVE MOLD FOR RESIN TRANSFER MOLDING

TECHNICAL FIELD

The present invention relates to a mold for resin transfer molding, and more particularly, to a lightweight thermally responsive mold.

BACKGROUND ART

The process of resin transfer molding typically comprises injecting a precatalyzed resin into a closed mold. Once the mold is filled, the resin is cured and the part ejected. Often, the resin is injected through a dry fiber preform preplaced in the mold for enhanced structural integrity.

In order to achieve high volume production, a heated mold is used to shorten overall cycle time by reducing the filling and cure times of the process. However, prior art shell molds have poor thermal response characteristics due to their high thermal mass, and therefore are unable to operate at high processing temperatures and unable to dissipate heat effectively.

As the resin cures within the mold, a significant amount of heat is given off by the resin (this release of heat is termed "exotherm"). If the exotherm heat is too high, the resin may crack due to excessive shrinkage, or other material defects such as surface imperfections, discoloration, or poor dimensional control may occur. Accordingly, when exotherm heat is high, the normal processing temperature of the mold must be maintained at a low level in order to avoid such resin problems.

It is desirable to process the resins through a mold at higher temperatures and to provide means for dissipating the exotherm heat to prevent damage to the resin while allowing such processing at higher temperatures. Prior art RTM shell molds are typically solid, heavy objects with a heavy concrete support structure, or other solid structure. Such prior art molds are not thermally responsive enough to provide exotherm heat dissipation to allow higher processing temperatures.

A thermally responsive mold would not only permit higher processing temperatures, but would also allow the use of high reactivity resins, thus resulting in greater in-mold cure, better dimensional control, shorter cycle time, and fewer component defects due to resin cracking from excessive shrinkage, surface imperfections or discoloration.

SUMMARY OF THE INVENTION

The present invention overcomes the above-referenced shortcomings of prior art RTM shell molds by providing an RTM shell mold with a hollow support structure comprising a plurality of intersecting upstanding support ribs supporting a substrate layer which Supports a thin, hard, thermally responsive mold shell. The shell has a low thermal mass which provides significant improvements in thermal responsiveness, thereby allowing higher processing temperatures, and the substrate acts as a heat sink to dissipate heat from the shell, particularly from exotherm. The resulting improvements are reduced cycle times, greater in-mold cure, and fewer component defects.

More specifically, the present invention provides a mold for use with a resin transfer molding process, comprising first and second support frames including a plurality of upstanding intersecting support ribs, and first and second substrates supported by the first and second support frames, respectively. The substrates include heating tubes passing therethrough. First and second hard shells are supported by the first and second substrates, respectively. The first and second shells cooperate to form a mold cavity therebetween, and each hard shell is less than approximately 10 mm thick.

Another aspect of the present invention provides a mold for use with a resin transfer molding process, comprising first and second substantially hollow support frames including a plurality of upstanding intersecting support ribs, each of the support ribs having a height substantially greater than its width. First and second substrates are supported by the first and second support frames, respectively, and first and second nickel shells are supported by the first and second substrates, respectively. The first and second nickel shells cooperate to form a mold cavity therebetween.

Accordingly, an object of the present invention is to provide a lightweight, thermally responsive RTM shell mold which permits higher processing temperatures, use of high reactivity resins, greater in-mold cure, and produces fewer component defects.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
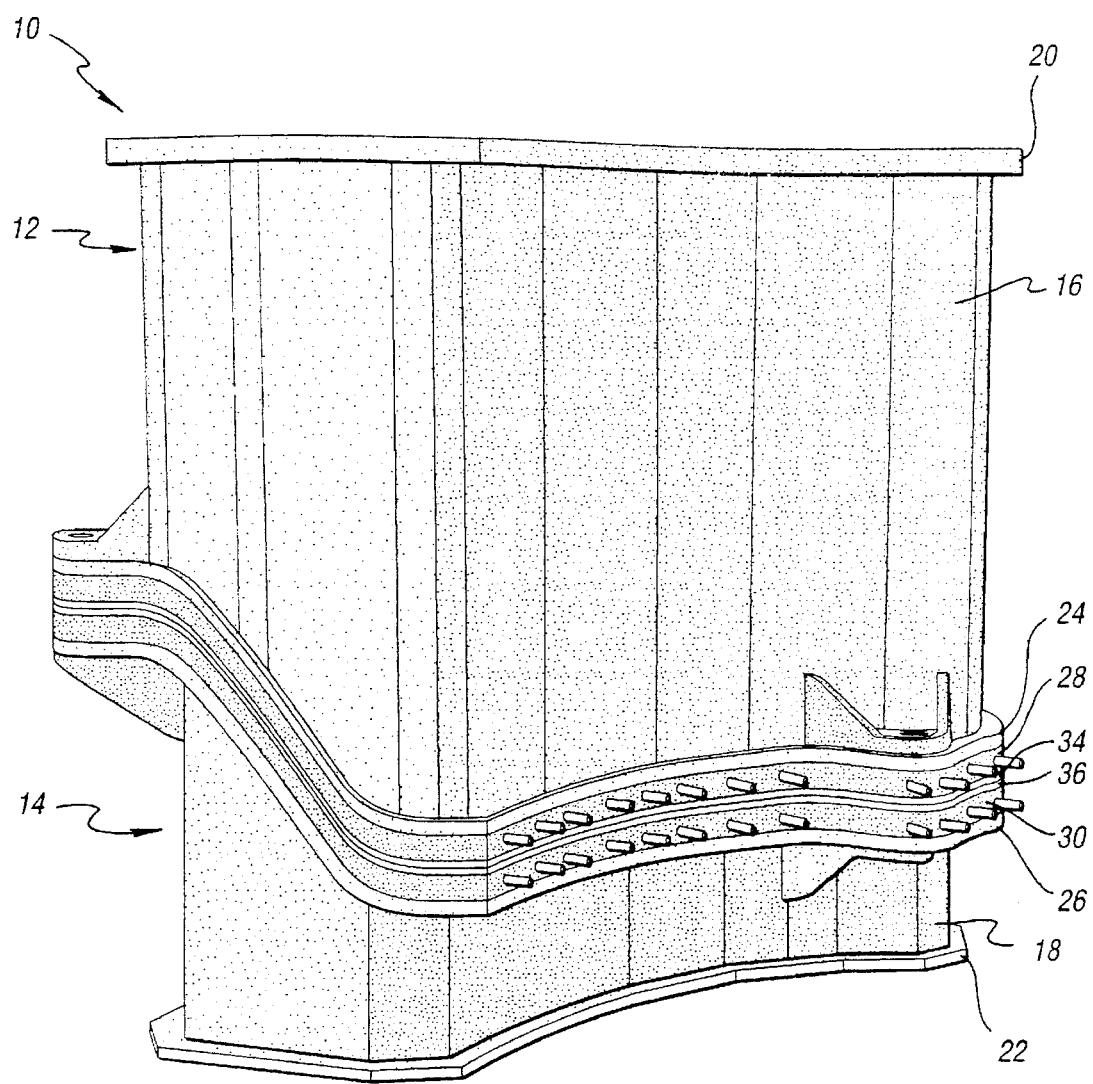
FIG. 1 shows a perspective view Of an RTM shell mold in accordance with the present invention.
Figure 2:
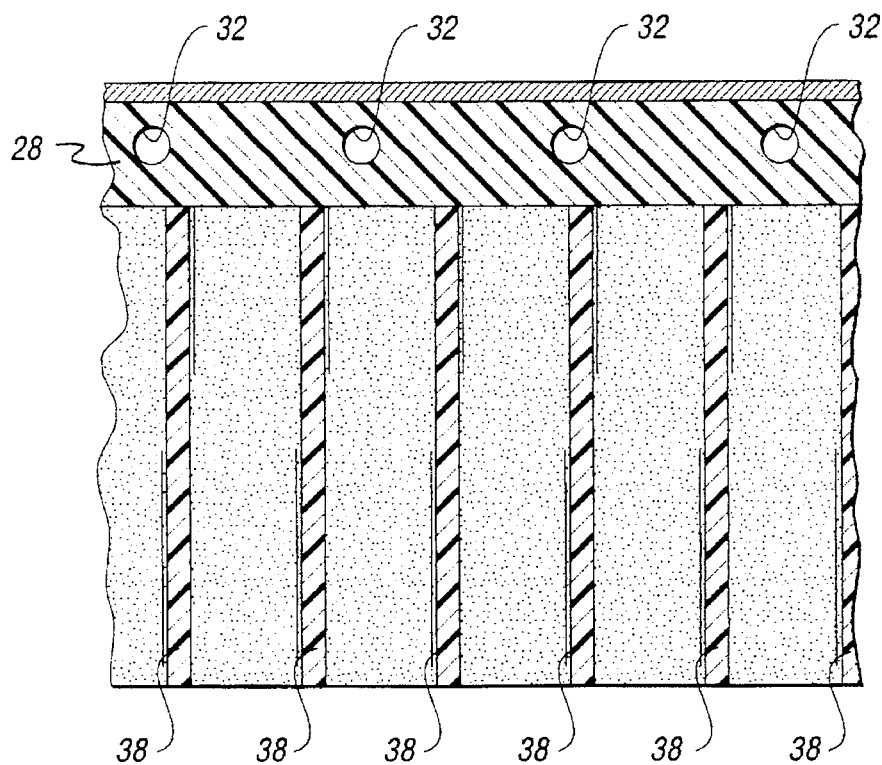
FIG. 2 shows a schematically arranged cutaway sectional view of a mold half in accordance with the present invention.

Referring to FIGS. 1 and 2, an RTM shell mold 10 for use with a resin transfer molding process is shown in accordance with the present invention. The mold 10 comprises first and second mold halves 12,14. The first and second mold halves 12,14 each include a support frame 16,18, respectively. The support frames 16,18 include mold bases 20,22, respectively, and support flanges 24,26, respectively.

The support frames 16,18 are adapted to support first and second substrates 28,30, respectively. The substrates 28,30 carry the fluid heating tubes 32 for heating the respective shell 34,36.

Each support frame 16,18 includes a plurality of upstanding intersecting support ribs 38. The support ribs 38 are preferably a lightweight, rigid material, such as aluminum. Each substrate 28,30 preferably comprises a high thermal coefficient material in a polymer matrix. The high thermal coefficient material provides thermal responsiveness for the mold. Each substrate 28,30 is preferably in the range of 5–25 mm thick.

The hard shells 34,36 supported by the first and second substrates 28,30, respectively, are preferably a nickel, nickel-copper or nickel cobalt material of approximately 5 mm width. The hard shells 34,36 cooperate to form a mold cavity 33 therebetween.

Figure 4:
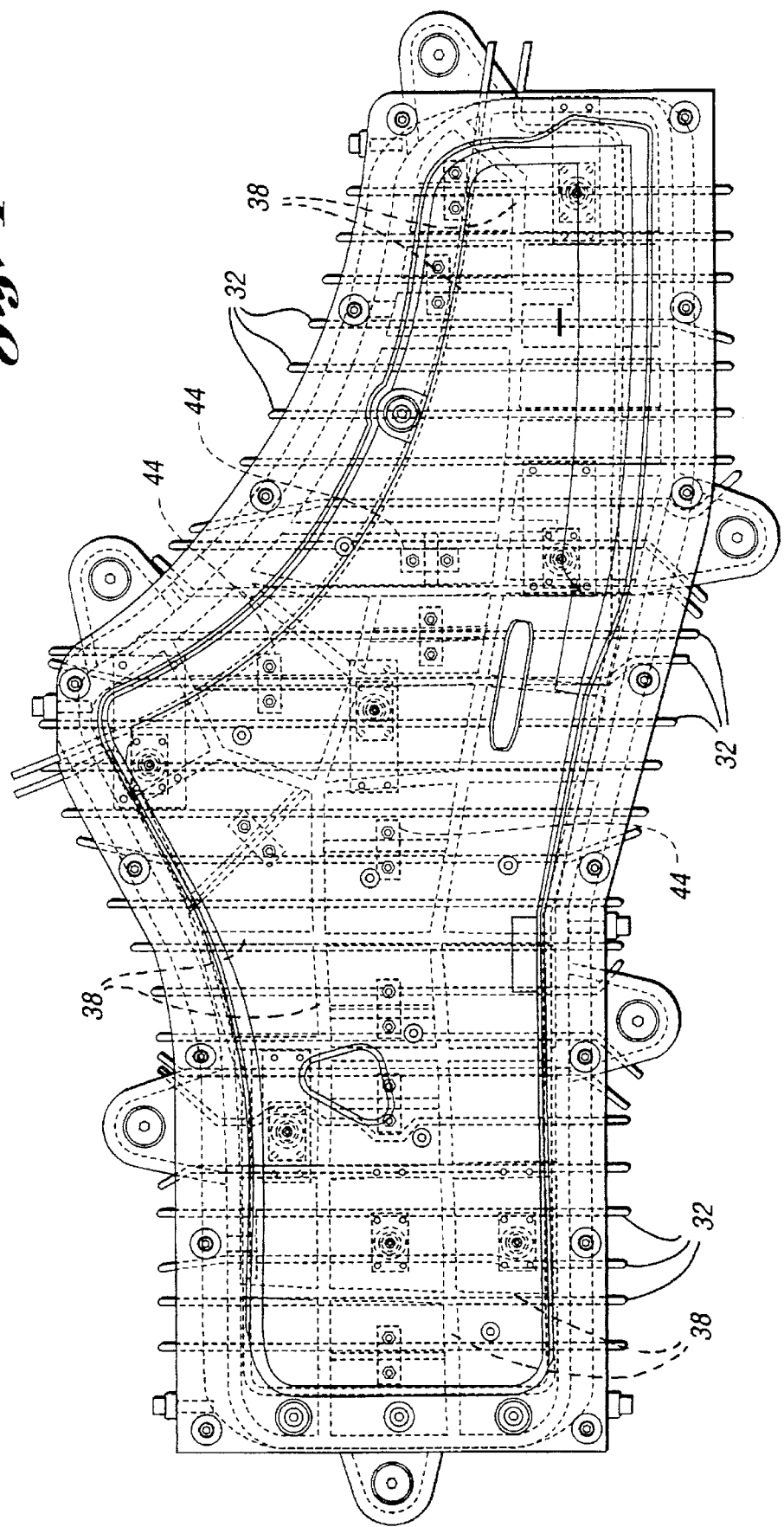
FIG. 4 shows a plan view of an RTM shell mold half in accordance with the present invention.
Figure 5:
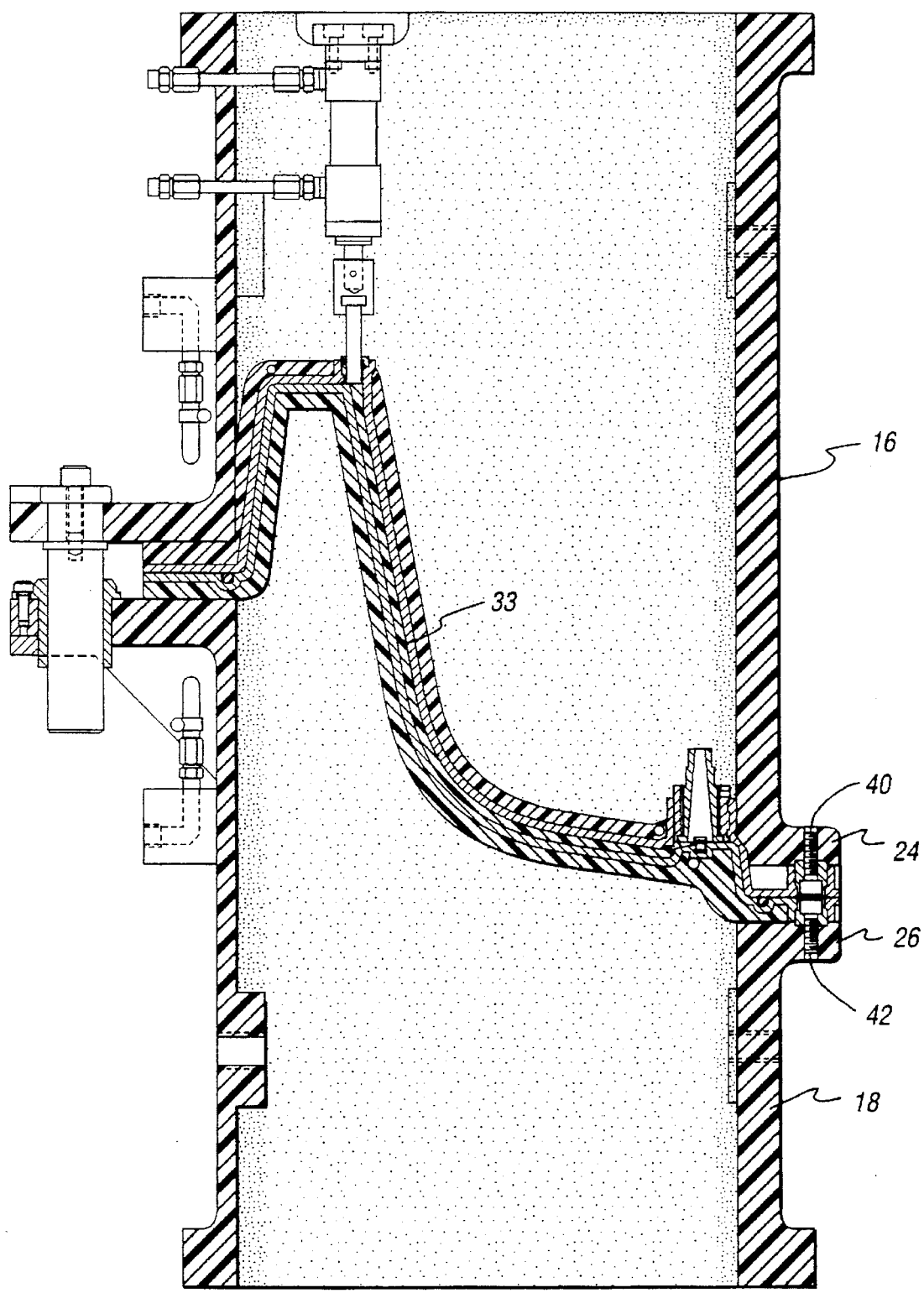
FIG. 5 shows a vertical sectional elevation view of the RTM shell mold shown in FIG. 1.

The various components could be bonded, bolted, studded, or otherwise secured together. In the preferred embodiment, the respective nickel shells 34,36 are secured by the respective bolts 40,42 to the respective support flange 24,26 to secure each mold half 12,14 together. In this embodiment, the respective substrates 28,30 are sandwiched between the respective shell 34,36 and the respective support frame 16,18. Belt straps 44 are also provided for securing the respective shell 34,36 to its support frame 16,18, as shown in phantom in FIG. 4.

Figure 3:
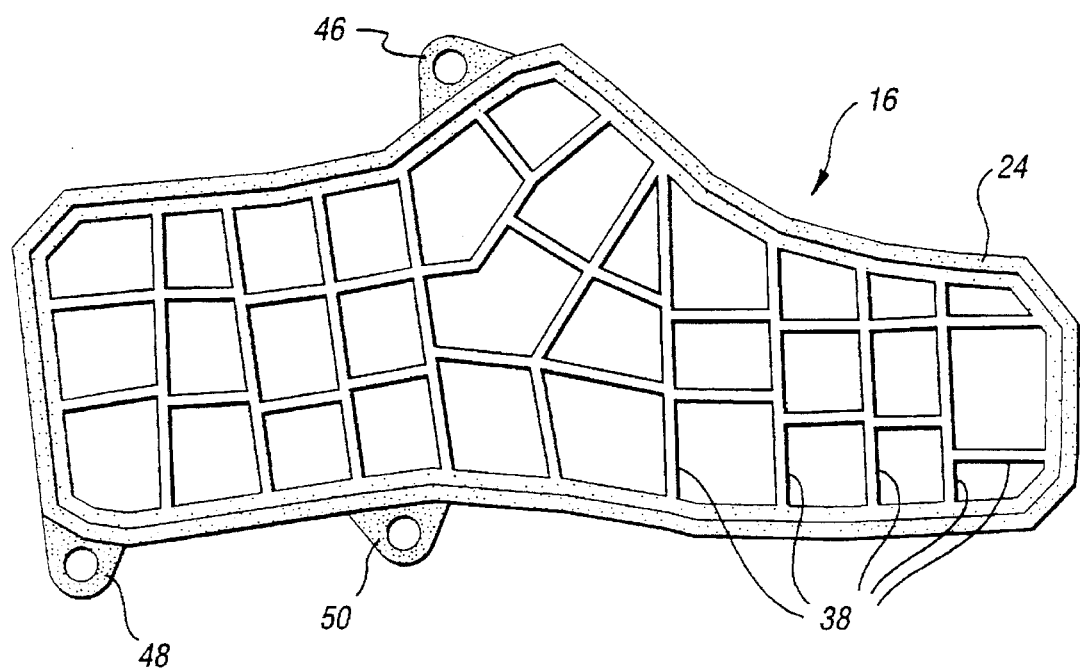
FIG. 3 shows a plan view of a support frame for use in an RTM shell mold in accordance with the present invention.

As shown in FIG. 3, the support frame 16 includes a peripheral flange 24 and a series of guide pin socket tabs 46,48,50 for locating the two mold halves. The upstanding intersecting support ribs 38 form a number of hollow pockets therebetween. Finite element analysis is used to space the ribs 38 in order to minimize shell deflection in the center of the pockets.

This support frame configuration is much different and lighter than prior art glass fiber reinforced epoxy molds or cement molds. The lightweight design and construction can permit low capital investment in equipment to be used to manipulate the molds, very large molds can be manufactured which would be difficult to manufacture and manipulate using traditional methods, and the mold shells 34,36 can be replaced and realigned quickly and accurately at a much lower cost than would be incurred to retool.

The low thermal mass of the mold is such that a high degree of temperature control is achievable leading to low temperature variation across the mold surface. This feature also permits zone heating to be used effectively and permits rapid heating to counteract mold quench during resin injection. The thermal response of the mold is such that resin cure may be considered to occur quasi-isothermally, thus permitting higher processing temperatures, the use of high reactivity resins, greater in-mold cure, and fewer component defects.

The thin nickel shells 34,36 provide molding surfaces having high quality, high definition and hard wearing. The support frames 16,18 transmit the service loads generated during the molding process.

The thin shells 34,36 provide significant thermal benefits. The liquid heating tubes 32 are cast into the highly conductive substrates 28,30 in intimate contact with the respective shell 34,36 in order to heat and cool the shells. The low thermal mass of the shells 34,36 provides a fast response to heater input which contributes to the exceptional degree of mold surface temperature control and the ability to rapidly counteract mold quench due to injection of cooler resin. The high diffusivity of the mold facilitates high heat transfer rates during resin cure which results in very low resin exotherm during cure.

Figure 6A:
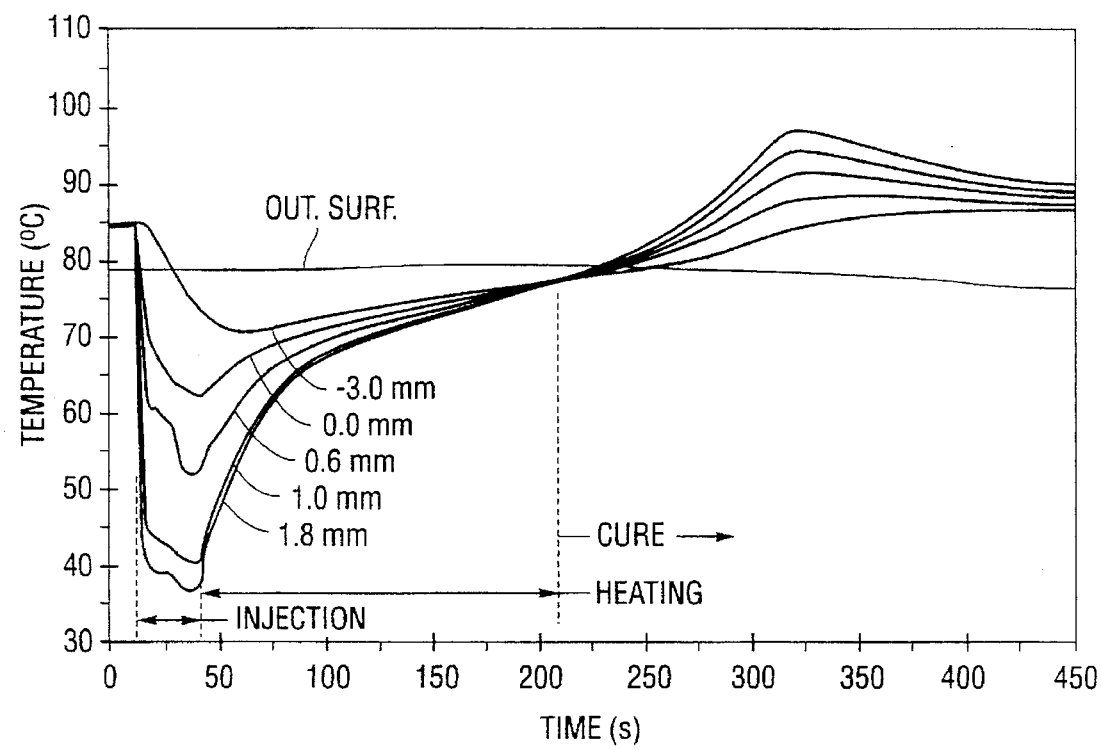
FIG. 6a shows a time vs. temperature profile for a prior art RTM shell mold.
Figure 6B:
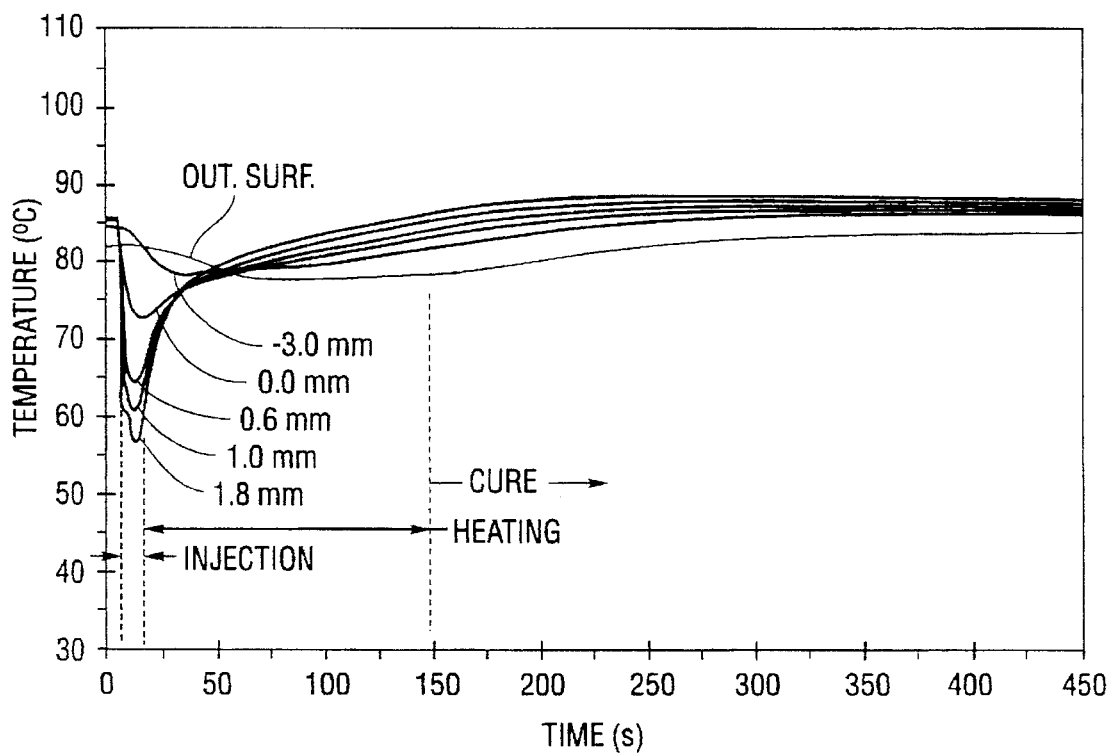
FIG. 6b shows a time vs. temperature profile for an RTM shell mold in accordance with the present invention.

Referring to FIGS. 6a and 6b, a comparison is made between prior art mold temperature performance and mold temperature performance in accordance with the present invention. The various plots of FIGS. 6a and 6b illustrate temperature curves corresponding with various locations measured with respect to the mold cavity surface. The positive numbers indicate positions inside the mold cavity, and negative numbers indicate positions within the shell. As illustrated in FIG. 6a, exotherm temperatures are significantly higher than the mold surface temperature during cure. With the present invention, the nickel shells and substrates act as heat sinks to carry exotherm heat quickly out of the resin such that the resin cure may occur substantially isothermally. Accordingly, the normal mold processing temperatures can be raised, as illustrated in FIG. 6b, thus improving processing characteristics.

The high thermal responsiveness of the mold design permits the manufacture of resin components at higher processing temperatures, since the absence of a significant exotherm can improve process control and may eliminate component defects associated with high resin exotherm temperatures during cure. With this temperature control, there is very little mold temperature variation as the resin is injected into the mold and cured within the mold, which is beneficial in terms of process control. The low thermal mass of the mold has additional benefits in terms of in-mold data acquisition as thermal trends inside the mold cavity can be detected outside, thus avoiding the need to adopt intrusive temperature measurement techniques.

Another advantage of this configuration is that faster catalysts can be used to enhance resin cure due to the improved heat dissipation through the shell and substrate, thus reducing cycle time. A further advantage of this design is that the shell may be removed from the support frame and easily replaced when damaged.

While the best mode for carrying out the invention has been described in detail, those familiar with the art to which this invention relates will recognize various alternative designs and embodiments for practicing the invention within the scope of the appended claims.

What is claimed is:

1. A mold for use with a resin transfer molding process, the mold having improved thermal response characteristics, the mold comprising:

first and second support frames including a plurality of upstanding intersecting support ribs;

first and second substrates supported by said first and second support frames, respectively, said substrates including heating tubes passing therethrough, wherein each said substrate comprises a material with high thermal coefficient; and first and second hard shells supported by said first and second substrates, respectively, said first and second shells cooperating to form a mold cavity therebetween, each said hard shell being less than 10 mm thick.

2. The mold of claim 1, wherein each said hard shell comprises nickel.

3. The mold of claim 1, wherein each said substrate comprises a copper-filled epoxy material.

4. The mold of claim 1, wherein each said substrate is less than 25 mm thick.

5. The mold of claim 1, wherein said first and second support frames comprise an aluminum material.

6. The mold of claim 1, wherein said first and second support frames each comprise a peripheral flange which is secured to the respective shell.

7. A mold for use with a resin transfer molding process, comprising:

first and second substantially hollow support frames including a plurality of upstanding intersecting support ribs, each of said support ribs having a height substantially greater than its width;

first and second substrates supported by said first and second support frames, respectively, said substrates including heating tubes passing therethrough; and first and second nickel shells supported by said first and second substrates, respectively, said first and second shells cooperating to form a mold cavity therebetween, each said shell being less than 10 mm thick.

8. The mold of claim 7, wherein each said substrate comprises a copper-filled epoxy material less than 25 mm thick, and each said frame comprises an aluminum material.

9. A mold for use with a resin transfer molding process, comprising:

first and second support frames including a plurality of upstanding intersecting aluminum support ribs, each of said support ribs having a length substantially greater than its width, said support frames each having a peripheral flange;

first and second copper-filled epoxy substrates supported by said first and second support frames, respectively, said substrates each being less than 25 mm thick, and each said substrate including a plurality of heating tubes passing therethrough; and first and second nickel shells supported by said first and second substrates, respectively, said first and second shells cooperating to form a mold cavity therebetween, each said shell being less than 10 mm thick, and each said shell being secured to the peripheral flange on the respective support frame.

* * * * *